(12) United States Patent
Howe et al.

(10) Patent No.: US 8,332,911 B2
(45) Date of Patent: Dec. 11, 2012

(54) METHOD AND SYSTEM FOR DENYING CABLE MODEM ACCESS TO A BROADBAND NETWORK

(75) Inventors: Jeffrey J Howe, West Chicago, IL (US); Alan Doucette, Naperville, IL (US)

(73) Assignee: ARRIS Group, Inc., Suwanee, GA (US)

( * ) Notice: Subject to any disclaimer, the term of this patent is extended or adjusted under 35 U.S.C. 154(b) by 833 days.

(21) Appl. No.: 11/775,051

(22) Filed: Jul. 9, 2007

(65) Prior Publication Data

US 2008/0010668 A1 Jan. 10, 2008

Related U.S. Application Data

(60) Provisional application No. 60/819,582, filed on Jul. 10, 2006.

(51) Int. Cl.
*H04L 29/06* (2006.01)
(52) U.S. Cl. ............. 726/3; 709/227; 725/111; 455/574
(58) Field of Classification Search .................. 321/201; 725/111; 709/227; 455/574
See application file for complete search history.

(56) References Cited

U.S. PATENT DOCUMENTS

| 6,170,061 | B1* | 1/2001 | Beser | 726/3 |
| 6,742,186 | B1* | 5/2004 | Roeck | 725/111 |
| 7,603,147 | B2* | 10/2009 | Son et al. | 455/574 |
| 2005/0138179 | A1* | 6/2005 | Encarnacion et al. | 709/227 |
| 2007/0276943 | A1* | 11/2007 | Marez et al. | 709/225 |

* cited by examiner

*Primary Examiner* — Brandon Hoffman
*Assistant Examiner* — Michael D Anderson
(74) *Attorney, Agent, or Firm* — Troy A. Van Aacken; Robert J. Starr

(57) ABSTRACT

A device, such as a cable modem or embedded media terminal adaptor that attempts to obtain unauthorized network services, is designated by head end equipment, such as a CMTS, as being a 'rogue' device. Upon an initial range request from the rogue device, the CMTS responds with a continuing range command. Upon receiving each periodic range request transmitted from the rogue device during a periodic station maintenance opportunity, the CMTS responds with another continuing range command. Thus, the rogue device does not ever establish connection with the CMTS because an ACK message is not received back from the CMTS. Moreover, use of CMTS resources for processing request from rogue devices is minimized because the rogue device does not reinitialize its MAC after a predetermined period of time, which it would do if a periodic ranging opportunity was not scheduled.

17 Claims, 1 Drawing Sheet

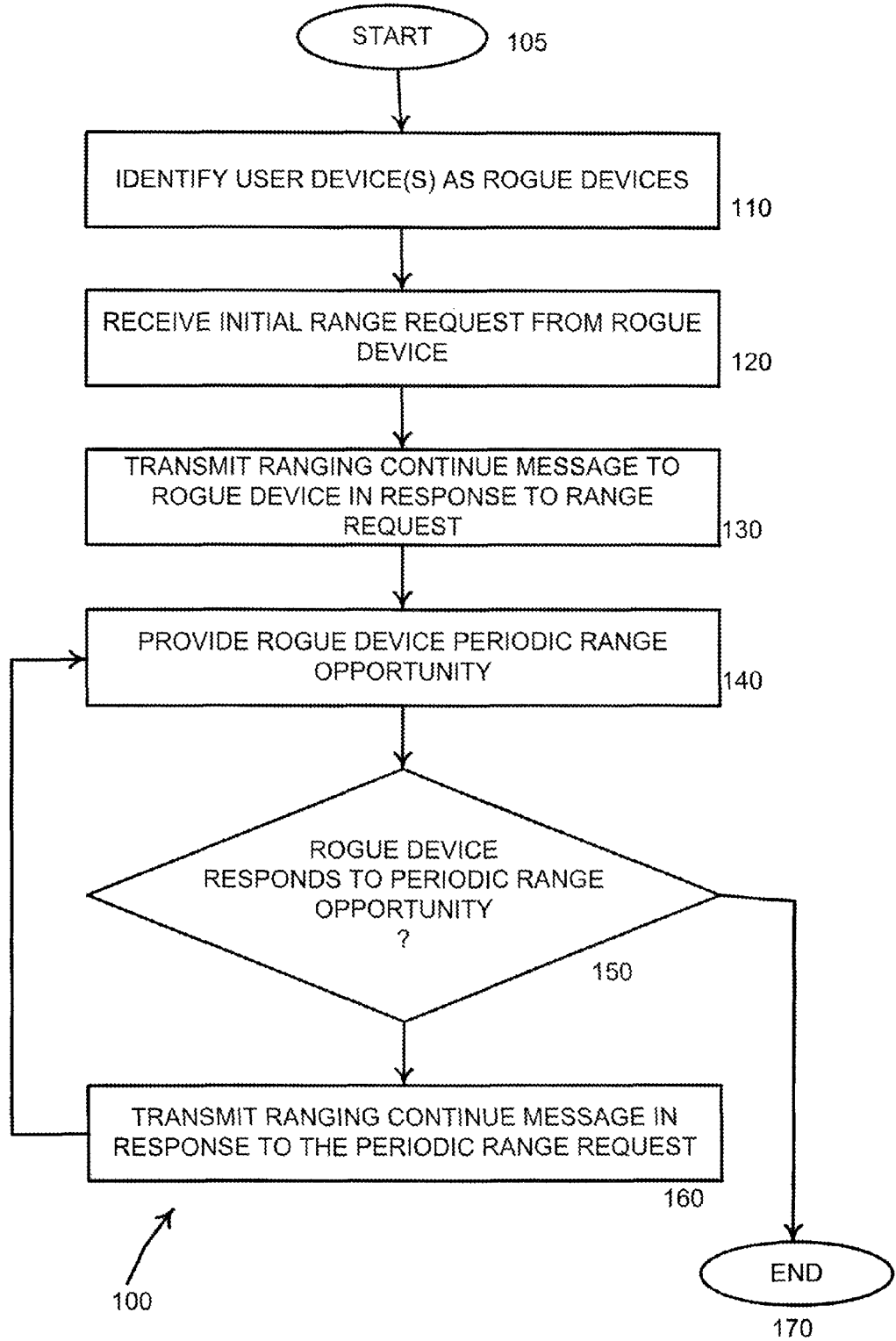

METHOD AND SYSTEM FOR DENYING CABLE MODEM ACCESS TO A BROADBAND NETWORK

CROSS REFERENCE TO RELATED APPLICATION

This application claims the benefit of priority under 35 U.S.C. 119(e) to the filing date of Howe, et. al., U.S. provisional patent application number 60/819,582 entitled "Method of denying cable modem access in a DOCSIS broadband access system," which was filed Jul. 10, 2006, and is incorporated herein by reference in its entirety.

FIELD OF THE INVENTION

This invention relates, generally, to communication networks and, more particularly, to cable modems for accessing resources over the communication network.

BRIEF DESCRIPTION OF DRAWINGS

FIG. 1 illustrates a flow diagram showing a method for denying network access to a given user device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning now to the figures, FIG. 1. illustrates a flow diagram showing a method 100 for denying network access to a given user device. Method 100 starts at step 105. At step 110, head end equipment, including a cable modem termination system ("CMTS"), identifies one or more rogue devices that is/are associated with a user that is known to have tried to access bandwidth from the multiple services operator ("MSO") that operates the head end equipment. The head end equipment may base the identification on a unique identifier, such as, for example, a media access control ("MAC") address, of a device that attempts to request and receive bandwidth that its associated user has not paid for.

The head end equipment receives an initial range request from a device desiring unauthorized service at step 120, the device having a unique MAC address, or other unique identifier associated with it. Service may be deemed to be unauthorized if the unique identifier is associated with an individual that has a current balance. In addition, if more than one device having the same unique identifier attempts to access network resources, an administrative procedure may be undertaken to determine if the one or more devices appearing to have the same unique identifier are spoofing a legitimate unique identifier. A device having a unique identifier is associated with an account having a balance due, or that appears to be illegitimately spoofing a legitimate unique identifier, is referred to as a rogue device.

Instead of processing the request from the rogue device and performing other operations in connection with the request for bandwidth from the rogue device, such as, for example, generating a message that the associated account has a past due balance and then sending the message to the rogue device, head end equipment transmits a ranging continue message to the requesting rogue device at step 130 in response to the requests. It will be appreciated that a range response message, for example a RNG_RSP message in DOCSIS, typically can have one of a few different ranging status values, examples of which include: 'continue,' 'abort,' or 'success.' A cable modem, for example, does not advance to its ranging and registration actions until it receives a RNG_RSP with a status of 'success.' Therefore, continually sending the rogue modem RNG-RSPs with a status of 'continue' keeps that modem from completing the registration process and coming on line as an active device. A RNG-RSP with a 'status' of continue is an example of a ranging continue message, continuing range, range continue or other similar phrase as used herein. It will be appreciated that although, a ranging continue message is described in the context of a RNG-RSP DOCSIS message having a particular status, other similar messages used in networks systems other than DOCSIS networks are also understood to be referred to by ranging continue, continuing range, range continue or other similar phrase as used herein.

After sending the ranging continue message at step 130, head end equipment begins periodically sending periodic range opportunities to the rogue device, or devices, at step 140. In a DOCSIS network system, periodic ranging opportunity messages are provided in a MAP sent from the CMTS to cable modem devices, as known to those skilled in the art. The periodic range opportunities are typically sent in the map as unicast opportunities, as compared to an initial range opportunity that is typically sent as a broadcast opportunity. A typical period between periodic range opportunities may be 30 seconds.

At step 150, head end equipment determines whether a rogue device responds during a periodic range opportunity. If a rogue device responds to a periodic range opportunity, the head end equipment transmits a ranging continue message in response to the periodic range request message at step 160. After step 160, method 100 returns to step 140. At step 140, another periodic range opportunity is transmitted from the head end equipment to a rogue device according to a periodic range opportunity period that may be predetermined by the MSO. If the determination at step 150 is that a rogue device did not respond to the periodic range opportunity, method 100 ends at step 170.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for denying a user device access to bandwidth over a broadband network, comprising:

receiving a first ranging request message from a user device in response to a first ranging opportunity;

determining that the first ranging request message is from a rogue device;

transmitting the first ranging continue message to the rogue device in response to the first ranging request from the rogue device;

transmitting to the rogue device a periodic ranging opportunity;

receiving a response to the periodic ranging opportunity from the rogue device;

transmitting a second ranging continue message in response to the rogue device's response to the periodic ranging opportunity; and preventing the rogue device from completing registration by transmitting subsequent ranging continue messages to the rogue device in response to any further responses by the rogue device to any subsequent periodic ranging opportunities.

2. The method of claim 1 wherein the user device includes a cable modem.

3. The method of claim 1 wherein the user device includes an embedded media terminal adapter.

4. The method of claim 1 wherein the broadband network comprises a hybrid fiber coaxial network.

5. The method of claim 1 wherein the first ranging continue message comprises a RNG-RSP message having a status of 'continue'.

6. A method for denying a user device access to bandwidth service over a broadband network, comprising:

attempting to access unauthorized service;

receiving a first ranging opportunity in at least one bandwidth map;

transmitting a response to the first ranging opportunity;

receiving a first ranging continue message in response to the first ranging request transmitted during the first ranging opportunity;

sending responses to subsequent ranging opportunities; and continuing to receive subsequent continue ranging messages.

7. The method of claim 6 wherein the user device includes a cable modem.

8. The method of claim 6 wherein the user device includes an embedded media terminal adapter.

9. The method of claim 6 wherein the broadband network comprises a hybrid fiber coaxial network.

10. The method of claim 6 wherein the first ranging continue message comprises a RNG-RSP message having a status of 'continue'.

11. The method of claim 1 wherein the second ranging continue message comprises a RNG-RSP message having a status of 'continue'.

12. The method of claim 6 wherein each of the subsequent continue ranging messages comprises a RNG-RSP message having a status of 'continue'.

13. The method of claim 6 wherein the first ranging opportunity comprises an initial broadcast ranging opportunity.

14. The method of claim 1 wherein the first ranging opportunity comprises an initial broadcast ranging opportunity.

15. The method of claim 1 wherein determining that the first ranging request message is from a rogue device comprises:

maintaining data that can be used to identify whether a user device comprises at least one rogue device.

16. The method of claim 15 wherein the data comprises a media access control address.

17. The method of claim 1 wherein the broadband network comprises a DOCSIS broadband access network.

* * * * *